United States Patent
Herter

(10) Patent No.: US 11,511,863 B2
(45) Date of Patent: Nov. 29, 2022

(54) SLIDING JOINT FOR LOAD ALLEVIATION

(71) Applicant: The Boeing Company, Chicago, IL (US)

(72) Inventor: Andrew J. Herter, Everett, WA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 16/871,021

(22) Filed: May 10, 2020

(65) Prior Publication Data
US 2021/0347487 A1 Nov. 11, 2021

(51) Int. Cl.
*B64D 11/06* (2006.01)

(52) U.S. Cl.
CPC .............. *B64D 11/0648* (2014.12)

(58) Field of Classification Search
CPC .... B64D 11/0648; B64D 25/02; B64D 25/04; B64D 11/00; B64C 1/18
See application file for complete search history.

(56) References Cited

U.S. PATENT DOCUMENTS

| | | | | |
|---|---|---|---|---|
| 4,479,621 | A * | 10/1984 | Bergholz | B64C 1/18 244/118.1 |
| 5,499,783 | A * | 3/1996 | Marechal | B64D 25/04 188/374 |
| 8,376,276 | B2 * | 2/2013 | Benthien | B64C 1/066 244/119 |
| 8,523,109 | B2 * | 9/2013 | Demont | B64C 1/18 244/119 |
| 10,005,537 | B2 * | 6/2018 | Guering | B64C 1/061 |
| 2007/0080258 | A1 * | 4/2007 | Baatz | B64C 1/20 244/118.6 |
| 2009/0294587 | A1 * | 12/2009 | Ricaud | B64C 1/061 244/119 |
| 2012/0074259 | A1 * | 3/2012 | Demont | B64C 1/18 244/118.6 |
| 2019/0077513 | A1 * | 3/2019 | Oleson | B64D 11/0648 |

FOREIGN PATENT DOCUMENTS

| | | |
|---|---|---|
| EP | 0 922 632 A2 | 6/1999 |
| ES | 2 441 425 A1 | 2/2014 |

OTHER PUBLICATIONS

Extended European Search Report prepared by the European Patent Office in application No. EP 21 16 5980.0 dated Sep. 2, 2021.

* cited by examiner

*Primary Examiner* — Justin M Benedik
(74) *Attorney, Agent, or Firm* — McDonnell Boehnen Hulbert & Bergoff LLP

(57) ABSTRACT

Example methods and systems for isolating and alleviating load in an aircraft are described, comprising providing a sliding joint between a seat track and a flight deck floor panel. The sliding joint comprises a lug comprising a first end and a second end opposite the first end, wherein the first end is adapted to attach to the seat track and the second end comprises an elongate aperture, and a clevis comprising an oblate shaped slider bushing that is coupled to the lug.

20 Claims, 5 Drawing Sheets

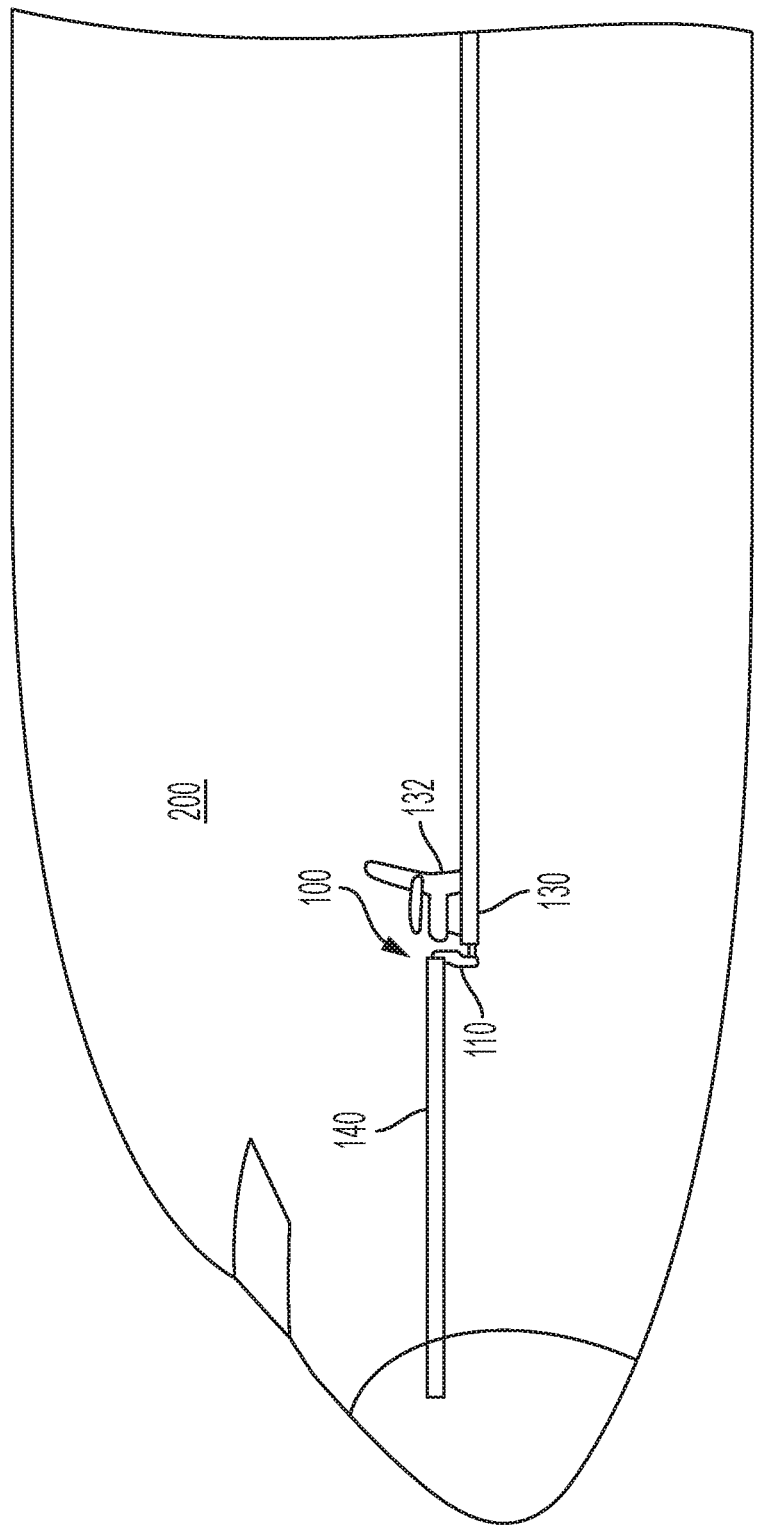

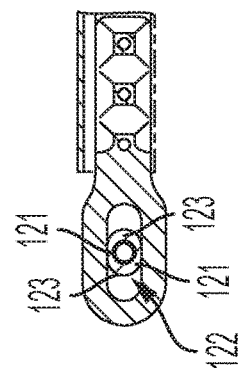
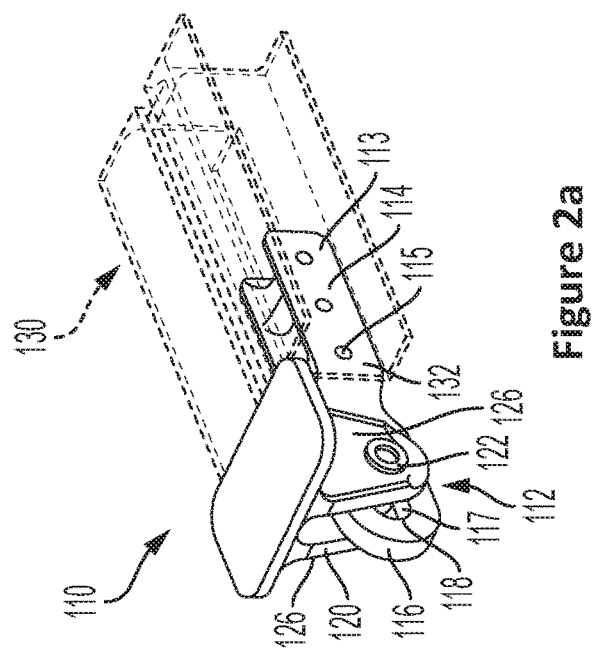
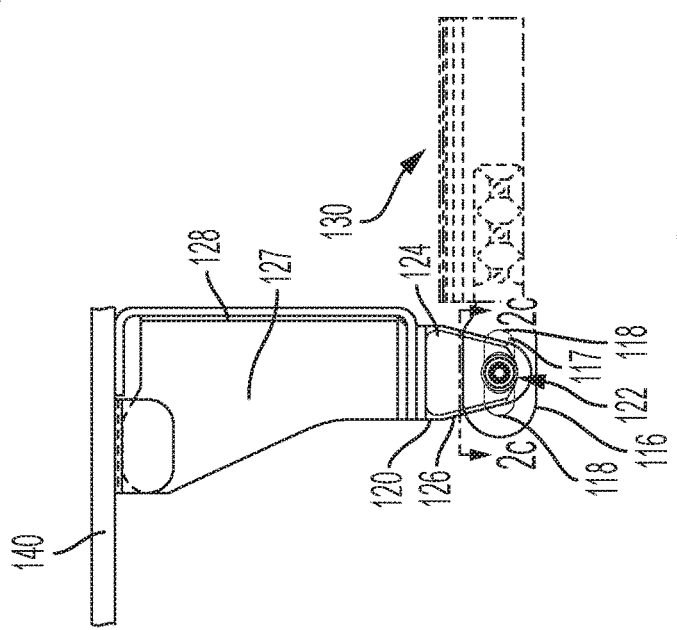

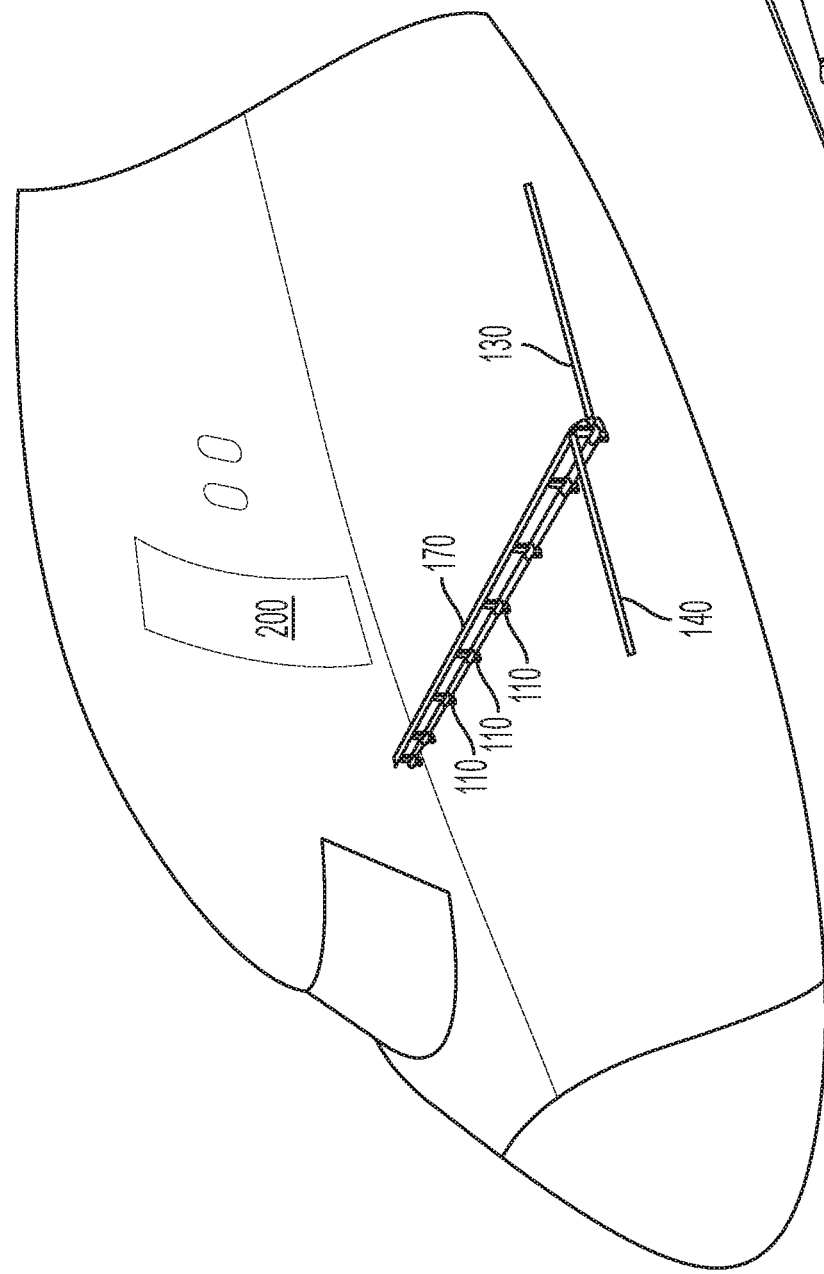
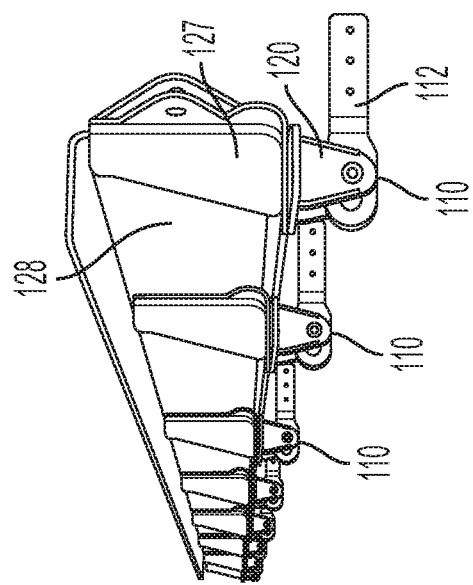
Figure 3
Figure 4 translating the oblate shaped slider bushing in forward and aft directions within the elongate aperture during cycling of the aircraft — 510

SLIDING JOINT FOR LOAD ALLEVIATION

FIELD

The present disclosure generally relates to alleviating load transfer between two floor components of an aircraft, and more particularly for providing a sliding joint for isolating thermal load and bending deflections between a seat track and a flight deck floor panel during cycling of an aircraft.

BACKGROUND

In modern commercial passenger aircraft, two or more seats are connected to an undercarriage to form a seat row, and the undercarriage is in turn securely mounted to one or more underlying longitudinally extending tracks. Such seat tracks are connected to a flight deck floor panel, which is located toward the forward end of the aircraft and contains, among other compartments, lavatories and a flight cabin. Often there is a vertical step of at least several inches at the transition between flooring containing the seat track and the flight deck floor panel.

During cycling of an aircraft, the aircraft motion results in thermal loading and body bending of flooring components. Thermal stresses and body bending can accumulate and transfer via the joints between the seat track and the flight deck floor panel. The thermal and bending loads often reach a magnitude sufficient to cause a noticeable jostle to be transferred between the two sections of the aircraft. Furthermore, these loads can cause a joint to bind up and fatigue.

An improved system and method capable of isolating thermal loads and body bending between aircraft flooring panels, such as between a passenger seat track and a flight deck floor panel, is desired.

SUMMARY

In one example, a sliding joint for isolating load transfer between a seat track and a flight deck floor panel of an aircraft is described. The sliding joint comprises a lug comprising a first end and a second end opposite the first end, wherein the first end is adapted to attach to the seat track and the second end comprises an elongate aperture. The sliding joint further comprises a clevis comprising an oblate shaped slider bushing that is coupled to the lug.

In another example, an airframe structure assembly is provided. The airframe structure assembly comprises a seat track, a flight deck floor panel, and a sliding joint. The sliding joint comprises a lug comprising a first end and a second end opposite the first end, wherein the first end is adapted to attach to the seat track and the second end comprises an elongate aperture, and a clevis comprising an oblate shaped slider bushing that is coupled to the lug.

In another example, a method for isolating load transfer between a passenger seat track and a flight deck floor panel of an aircraft is provided. The method comprises attaching a first end of a lug to the seat track, the lug further comprising a second end having an elongate aperture therethrough, attaching a first end of a clevis to the flight deck floor panel, the first end of the clevis comprising a platform and a pair of arms extending from the platform, coupling an oblate shaped slider bushing to the pair of arms of the clevis, and receiving the oblate shaped slider bushing within the elongate aperture to secure the clevis to the lug.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 1 illustrates an airframe structure assembly comprising a sliding joint between a seat track and a flight deck floor panel, according to an example implementation.

FIG. 2a illustrates a perspective view of a sliding joint such as the sliding joint used in the airframe structure assembly of FIG. 1, according to an example implementation.

FIG. 2b illustrates a side view of the sliding joint of FIG. 2a assembled to a flight deck floor panel and a seat track, according to an example implementation.

FIG. 2c illustrates a cross-sectional view of an oblate shaped slider bushing within the lug of the sliding joint of FIG. 2b, according to an example implementation.

FIG. 3 illustrates an example series of sliding joints positioned within an aircraft, according to an example implementation.

FIG. 4 illustrates a perspective and enlarged view of the series of sliding joints of FIG. 3, according to an example implementation.

DETAILED DESCRIPTION

Figure 5:
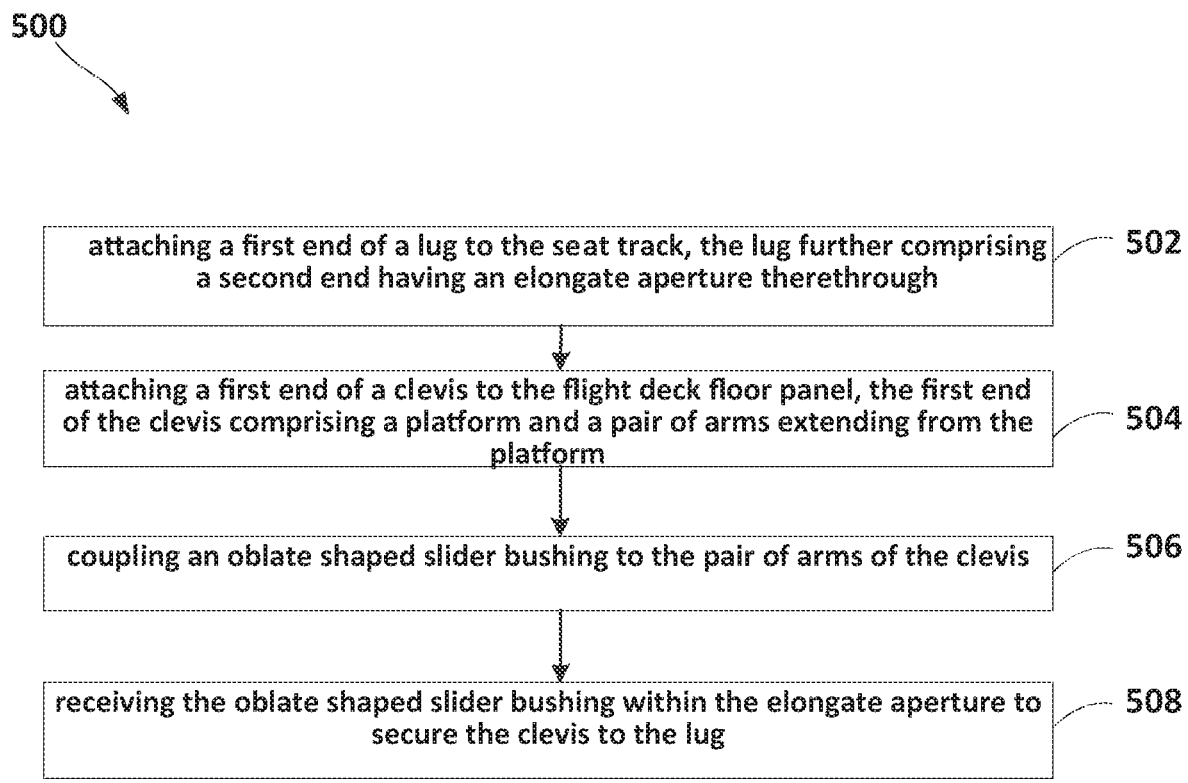
FIG. 5 illustrates a method for isolating load transfer between a seat track and a flight deck floor panel of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples, methods, and systems are described for a sliding joint to isolate load transfer between a seat track and a flight deck floor panel of an aircraft. To this end, a lug positioned within an open channel of a seat track receives a clevis having an oblate shaped bushing, allowing for forward and aft translation of the bushing within an elongated aperture of the lug. Within examples, the clevis has a platform that is adapted to affix to a flight deck floor panel. The translation of components of the sliding joint assembly prevents thermal and bending load accumulation between the seat track and the flight deck floor panel during cycling of an aircraft, while also accommodating the complex geometry which comprises a vertical step between the two surfaces.

Moreover, the oblate shape of the bushing provides an expanded surface area of contact of the bushing within an elongated opening of the lug during translation, which prevents wear on the bushing itself and thus improves the lifespan of the joint.

As used herein, a seat track may include any passenger seat track that accommodates one or more seating units of an aircraft. The seating units and seat track comprise standard equipment used throughout the aircraft industry, wherein the seat track includes a plurality of longitudinally spaced apart mounting receptacles to enable the seating units to be positioned at various positions along the seat track. The seat track is formed of a rigid material, such as a metal (e.g., titanium or the like), which facilitates its ability to serve as a mounting platform for seating units.

As used herein, a flight deck may include an aircraft cockpit, from which the pilot and crew operate the aircraft, and wherein various equipment and controls are located. The flight deck may further include additional rooms and compartments, such as lavatories, food preparation stations, and storage.

Referring to FIG. 1, an airframe structure assembly 100 comprising a seat track 130, a flight deck floor panel 140, and a sliding joint 110 is illustrated, according to an example. The sliding joint 110 is positioned between the seat track 130 and the flight deck floor panel 140. In FIG. 1, the airframe structure assembly is shown within an aircraft 200.

The aircraft 200 may be a commercial aircraft used to accommodate and transport passengers, wherein the passengers sit on seating units 132 mounted to the seat track 130.

The flight deck floor panel 140 is shown in FIG. 1 to be positioned on a different plane from the seat track 130. In the example of FIG. 1, the flight deck floor panel 140 is on a plane that is parallel to and higher than the plane on which the seat track 130 is located. In some examples, the flight deck floor panel 140 is located on a plane that is about 5-10 inches above the seat track 130. In some examples, the flight deck floor panel 140 is located about 7 inches above the seat track 130.

The sliding joint 110 provides the primary structural connection between the seat track 130 and the flight deck floor panel 140. The sliding joint 110 may be covered with a vertical panel or floor beam, so as to form a step between the seat track 130 and the flight deck floor panel 140. The sliding joint 110, which is described in further detail in FIGS. 2a-c, provides for free translation in the forward and aft directions. Thus, when one or both of the seat track 130 and the flight deck floor panel 140 experience jostling or otherwise move during flight, certain components of the sliding joint move as well, while isolating the movement from extending to the other floor panel.

FIG. 2a illustrates a perspective view of a sliding joint such as the sliding joint 110 used in the airframe structure assembly 100 of FIG. 1, according to an example implementation.

The sliding joint 110 comprises a lug 112 which is configured to be received within an open channel 133 of a seat track, such as the seat track 130 of FIG. 1. A portion of the seat track 130 of FIG. 1 is shown in FIG. 2a. A first end 113 of the lug 112 is shown in FIG. 2a to comprise an engagement portion 114 to engage the seat track 130. In FIG. 2a, the engagement portion 114 comprises a plurality of apertures 115 that engage a plurality of bolts therethrough to secure the engagement portion 114 within the seat track 130.

A second end 116 of the lug 112 comprises an elongate aperture 117. Within examples, the elongate aperture 117 comprises rounded ends 118, both of which are shown in the cross-sectional side view of FIG. 2b. The rounded ends 118 accommodate the shape of the oblate shaped slider bushing, thereby allowing the oblate shaped slider bushing to freely move from end to end within the elongate aperture 117 without becoming stuck. The elongate aperture 117 is sized and shaped to provide for one dimensional motion of a bushing within. This single dimensional motion accounts for thermal expansion or contraction or bending deflections of the seat track 130 and the flight deck floor panel 140 during flight of the aircraft 200.

The sliding joint 110 further comprises a clevis 120. The clevis 120 comprises an oblate shaped slider bushing 122. The elongate aperture 117 of the lug 112 is sized and shaped to receive the oblate shaped slider bushing 122, which slidably secures the clevis 120 to the lug 112. The oblate shaped slider bushing 122 is typically made from a strong material that is not prone to quick wear, for example a metal such as steel. In some examples, the oblate shaped slider bushing 122 is formed from corrosion resistant steel. In other examples, the oblate shaped slider bushing 122 is formed from titanium.

Because there is contact between the oblate shaped slider bushing 122 and the surfaces defining the elongate aperture 117, the outer surface of the oblate shaped slider bushing 122 is deemed a wear surface, and the oblate spheroid shape that comprises the bushing increases an area of the wear surface for the slider bushing 122. The expanded surface area of contact of the bushing within an elongated opening of the lug during translation, provided by this oblate spheroid shape, prevents wear on the bushing itself and thus improves the lifespan of the joint. The flattened top and bottom surfaces 121 shown in FIG. 2c form the expanded wear surface.

FIG. 2b illustrates a cross-sectional side view of the sliding joint 110 of FIG. 1 connected to the seat track 130 and the flight deck floor panel 140 of FIG. 1, according to an example implementation. The clevis 120 comprises a platform 124 at a first end of the clevis 120 and a pair of arms 126 (one being shown in FIG. 2b) extending from the platform 124. The oblate shaped slider bushing 122 extends through the pair of arms 126.

The platform 124 is adapted to affix to the flight deck floor panel 140, as shown in FIG. 2b. The platform 124 may affix directly to the flight deck floor panel or may affix to a stiffener, such as the stiffener 127 shown in FIG. 2b. The stiffener 127 may be a metal or other rigid structure which may additionally be present behind a vertical flooring panel 128 to structurally support the vertical panel 128. The vertical flooring panel 128 covers the step or transition gap between the seat track 130 and the flight deck floor panel 140.

FIG. 2c illustrates a cross-sectional view of an oblate shaped slider bushing of the sliding joint of FIG. 2b within the elongated aperture of the lug, according to an example implementation. The cross-section is taken along lines A-A of FIG. 2b. As previously noted, flattened top and bottom surfaces 121 of the slider bushing 122 form an expanded wear surface, which facilitates extension of the life of the bushing. Circular-shaped or rounded sides 123 maintain the spheroid shape for the bushing, allowing for smooth translation between ends 118 of the elongated aperture.

The accumulation of thermal loads and body bending during cycling of a flight can comprise half an inch or more. The sliding joint 110 described in detail above allows for improved lifespan of the joint as the elongate aperture is sized and shaped to provide for motion within the elongate aperture of the oblate shaped slider bushing, thereby accounting for thermal expansion or contraction or bending deflections of the passenger seat track and the flight deck floor panel during flight of the aircraft. The motion comprises movement in only one dimension. Thus, by decreasing accumulation of thermal loads and body bending applied to the joint, which contribute to joint fatigue or binding of the joint during cycling of an aircraft, the lifespan of the joint can be extended.

FIG. 3 illustrates an example series of sliding joints 110 positioned within an aircraft 200, according to an example implementation. As shown in FIG. 3, a plurality of sliding joints, such as the sliding joints 110 described with reference to FIGS. 1-2c, may be located across a width 170 of an aircraft, such as the aircraft 200 of FIG. 1, at the location of transition between the seat track 130 and the flight deck floor panel 140.

FIG. 4 illustrates a perspective and enlarged view of the series of sliding joints 110 of FIG. 3, according to an example implementation. FIG. 4 shows the stiffener 127 and the vertical panel 128, the clevis 120, and the lug 112 of FIG. 2b.

FIG. 5 shows a flowchart of an example of a method 500 for isolating load transfer between a passenger seat track and a flight deck floor panel of an aircraft, according to an example implementation. Method 500 shown in FIG. 5 presents a method that, for example, could be used with the airframe structure assembly 100 and/or performed by the airframe structure assembly 100 shown in FIG. 1. Method 500 includes one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes attaching a first end of a lug to the seat track, the lug further comprising a second end having an elongate aperture therethrough.

The lug may be the same as or similar to the lug 112 and the seat track may be similar to or the same as the seat track 130 described with reference to FIGS. 1-2b. In the example shown in FIGS. 2a-b, the first end 113 of the lug 112 comprises an engagement portion to engage the seat track 130. Within examples, the first end 113 is attached to the seat track 130 by inserting the first end 113 into a channel or other opening within the seat track 130. The first end 113 of the lug 112 may then be secured within the seat track 130 by any of a number of fasteners, such as but not limited to, bolts, screws, and the like. Should the seat track 130 comprise a different geometry than the geometry shown in the examples of FIGS. 1-2b, the first end 113 of the lug 112 may be formed to adapt to and fit within the geometry.

At block 504, the method 500 includes attaching a first end of a clevis to the flight deck floor panel, the first end of the clevis comprising a platform 124 and a pair of arms extending from the platform 124. The platform 124 is shown in the example of FIGS. 2a-b to have a flat surface, which can be affixed directly to the flight deck panel or to componentry attached to the flight deck panel, such as a vertical floor beam or stiffener located behind the vertical floor beam, as shown in FIG. 2b.

At block 506, the method 500 includes coupling an oblate shaped slider bushing to the pair of arms of the clevis. The oblate shaped slider bushing may be the same as or similar to the oblate shaped slider bushing 122 of FIGS. 2a-c. The oblate shaped slider bushing 122 is shown to comprise flattened top and bottom surfaces 121 and circular-shaped or rounded sides 123.

At block 508, the method 500 includes receiving the oblate shaped slider bushing within the elongate aperture to secure the clevis to the lug. The elongate aperture 117 at the second end 116 of the lug 112 comprises rounded ends 118 in the example shown in FIGS. 2a-b to accommodate the shape of the oblate shaped slider bushing, thereby allowing the oblate shaped slider bushing to move from end to end within the elongate aperture 117.

Within examples, movement of the flight deck floor panel 140 will move the clevis 120 and associated oblate shaped slider bushing 122 in the fore or aft directions within the elongate aperture 117. And in further examples, movement of the seat track 130 will move to the lug in the fore or aft directions.

Figure 6:
FIG. 6 illustrates another method for use with the method shown in FIG. 5, according to an example implementation.

FIG. 6 shows another method for use with the method 500 shown in FIG. 5, according to an example implementation. In FIG. 6, at block 510, the method includes translating the oblate shaped slider bushing in forward and aft directions within the elongate aperture during cycling of the aircraft. When the aircraft 200 takes off and then proceeds to fly in the air, one or both of the seat track 130 and the flight deck panel 140 may move or jostle. Such movement causes the slider bushing 122 to move in either a forward or an aft direction within the elongate aperture 117.

Within examples, the translation of components of the sliding joint assembly, all the while accommodating the complex geometry between the seat track 130 and the flight deck floor panel 140, prevents thermal and bending load accumulation between the seat track and the flight deck floor panel during cycling of an aircraft. The oblate shape of the bushing provides an expanded surface area of contact of the bushing within an elongated opening of the lug during translation, which prevents wear on the bushing itself and thus further improves the lifespan of the joint.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

Clause 1: A sliding joint for isolating load transfer between a seat track and a flight deck floor panel of an aircraft comprising a lug comprising a first end and a second end opposite the first end, wherein the first end is adapted to attach to the seat track and the second end comprises an elongate aperture; and a clevis comprising an oblate shaped slider bushing that is coupled to the lug.

Clause 2: The sliding joint of Clause 1, wherein the elongate aperture of the lug is sized and shaped to receive the oblate shaped slider bushing to slidably secure the clevis to the lug.

Clause 3: The sliding joint of Clause 2, wherein the elongate aperture comprises rounded ends.

Clause 4: The sliding joint of any of Clauses 1-3, wherein the first end of the lug comprises an engagement portion to engage the seat track.

Clause 5: The sliding joint of any of Clauses 1-4, wherein the clevis comprises a platform at a first end of the clevis and a pair of arms extending from the platform.

Clause 6: The sliding joint of Clause 5, wherein the oblate shaped slider bushing extends through the pair of arms.

Clause 7: The sliding joint of Clause 6, wherein the oblate shaped slider bushing comprises an oblate spheroid shape, thereby increasing an area of wear surface for the oblate shaped slider bushing.

Clause 8: The sliding joint of any of Clauses 1-7, wherein a platform of the clevis is adapted to affix to the flight deck floor panel.

Clause 9: The sliding joint of any of Clauses 1-8, wherein the elongate aperture is sized and shaped to provide for one dimensional motion of the oblate shaped slider bushing within the elongate aperture, thereby accounting for thermal expansion or contraction or bending deflections of the seat track and the flight deck floor panel during flight of the aircraft.

Clause 10: The sliding joint of Clause 9, wherein the one dimensional motion comprises forward and aft translation of the oblate shaped slider bushing within the elongate aperture.

Clause 11: An airframe structure assembly comprising a seat track; a flight deck floor panel; and a sliding joint, the sliding joint comprising a lug defining a first end and a second end opposite the first end, wherein the second end comprises an elongate aperture; and a clevis comprising an oblate shaped slider bushing that is coupled to the lug.

Clause 12: The airframe structure assembly of Clause 11, wherein the first end of the lug is affixed to the seat track.

Clause 13: The airframe structure assembly of Clause 12, wherein the clevis comprises a first end having a platform and a pair of arms extending from the platform, the first end being affixed to the flight deck floor panel.

Clause 14: The airframe structure assembly of Clause 13, wherein the oblate shaped slider bushing is coupled to and extends between the pair of arms, and wherein the oblate shaped slider bushing is received within the elongate aperture of the lug.

Clause 15: The airframe structure assembly of Clause 14, wherein the elongate aperture is sized and shaped to provide for motion within the elongate aperture of the oblate shaped slider bushing, thereby accounting for thermal expansion or contraction or bending deflections of the seat track and the flight deck floor panel during flight of the aircraft.

Clause 16: The airframe structure assembly of Clause 15, wherein the motion comprises movement in only one dimension.

Clause 17: The airframe structure assembly of Clause 16, wherein the motion comprises forward and aft translation of the oblate shaped slider bushing within the elongate aperture.

Clause 18: The airframe structure assembly of any of Clauses 11-17, wherein the oblate shaped slider bushing comprises an oblate spheroid shape.

Clause 19: A method for isolating load transfer between a passenger seat track and a flight deck floor panel of an aircraft, the method comprising attaching a first end of a lug to the passenger seat track, the lug further comprising a second end having an elongate aperture therethrough; attaching a first end of a clevis to the flight deck floor panel, the first end of the clevis comprising a platform and a pair of arms extending from the platform; coupling an oblate shaped slider bushing to the pair of arms of the clevis; and receiving the oblate shaped slider bushing within the elongate aperture to secure the clevis to the lug.

Clause 20: The method of Clause 19, further comprising translating the oblate shaped slider bushing in forward and aft directions within the elongate aperture during cycling of the aircraft.

What is claimed is:

1. A sliding joint for isolating load transfer between a seat track and a flight deck floor panel of an aircraft comprising:
   a lug comprising a first end and a second end opposite the first end, wherein the first end is adapted to attach to the seat track and the second end comprises an elongate aperture; and
   a clevis comprising an oblate shaped slider bushing that is coupled to the second end of the lug, wherein a first end of the clevis is adapted to attach to the flight deck floor panel.

2. The sliding joint of claim 1, wherein the elongate aperture of the lug is sized and shaped to receive the oblate shaped slider bushing to slidably secure the clevis to the lug.

3. The sliding joint of claim 2, wherein the elongate aperture comprises rounded ends.

4. The sliding joint of claim 1, wherein the first end of the lug comprises an engagement portion to engage the seat track.

5. The sliding joint of claim 1, wherein the clevis comprises a platform at the first end of the clevis and a pair of arms extending from the platform.

6. The sliding joint of claim 5, wherein the oblate shaped slider bushing extends through the pair of arms.

7. The sliding joint of claim 6, wherein the oblate shaped slider bushing comprises an oblate spheroid shape, thereby increasing an area of wear surface for the oblate shaped slider bushing.

8. The sliding joint of claim 1, wherein the elongate aperture is sized and shaped to provide for one dimensional motion of the oblate shaped slider bushing within the elongate aperture, thereby accounting for thermal expansion or contraction or bending deflections of the seat track and the flight deck floor panel during flight of the aircraft.

9. The sliding joint of claim 8, wherein the one dimensional motion comprises forward and aft translation of the oblate shaped slider bushing within the elongate aperture.

10. An airframe structure assembly comprising:
    a seat track;
    a flight deck floor panel; and
    a sliding joint, the sliding joint comprising:
      a lug defining a first end and a second end opposite the first end, wherein the first end is attached to the seat track and wherein the second end comprises an elongate aperture; and
      a clevis comprising an oblate shaped slider bushing that is coupled to the second end of the lug, wherein a first end of the clevis is attached to the flight deck floor panel.

11. The airframe structure assembly of claim 10, wherein the clevis comprises the first end having a platform and a pair of arms extending from the platform.

12. The airframe structure assembly of claim 11, wherein the oblate shaped slider bushing is coupled to and extends between the pair of arms, and wherein the oblate shaped slider bushing is received within the elongate aperture of the lug.

13. The airframe structure assembly of claim 12, wherein the elongate aperture is sized and shaped to provide for motion within the elongate aperture of the oblate shaped slider bushing, thereby accounting for thermal expansion or contraction or bending deflections of the seat track and the flight deck floor panel during flight of the aircraft.

14. The airframe structure assembly of claim 13, wherein the motion comprises movement in only one dimension.

15. The airframe structure assembly of claim 14, wherein the motion comprises forward and aft translation of the oblate shaped slider bushing within the elongate aperture.

16. The airframe structure assembly of claim 10, wherein the oblate shaped slider bushing comprises an oblate spheroid shape.

17. The airframe structure assembly of claim 10, wherein the elongate aperture comprises rounded ends.

18. The airframe structure assembly of claim 10, wherein the first end of the lug comprises an engagement portion to engage the seat track.

19. A method for isolating load transfer between a passenger seat track and a flight deck floor panel of an aircraft, the method comprising:
- attaching a first end of a lug to the passenger seat track, the lug further comprising a second end having an elongate aperture therethrough;
- attaching a first end of a clevis to the flight deck floor panel, the first end of the clevis comprising a platform and a pair of arms extending from the platform;
- coupling an oblate shaped slider bushing to the pair of arms of the clevis; and
- receiving the oblate shaped slider bushing within the elongate aperture to secure the clevis to the lug.

20. The method of claim 19, further comprising:
- translating the oblate shaped slider bushing in forward and aft directions within the elongate aperture during cycling of the aircraft.

\* \* \* \* \*